US012024400B2

(12) United States Patent
Bizzozero et al.

(10) Patent No.: US 12,024,400 B2
(45) Date of Patent: Jul. 2, 2024

(54) INSTALLATION DEVICE FOR USE IN AN ELEVATOR SHAFT

(71) Applicant: Inventio AG, Hergiswil (CH)

(72) Inventors: Gabrielle Bizzozero, Gisikon (CH); Dragan Gavric, Küssnacht am Rigi (CH); Viktor Wyrsch, Steinen (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/755,444

(22) PCT Filed: Nov. 2, 2020

(86) PCT No.: PCT/EP2020/080676
§ 371 (c)(1),
(2) Date: Apr. 29, 2022

(87) PCT Pub. No.: WO2021/089480
PCT Pub. Date: May 14, 2021

(65) Prior Publication Data
US 2024/0150154 A1 May 9, 2024

(30) Foreign Application Priority Data
Nov. 8, 2019 (EP) .................................... 19207913

(51) Int. Cl.
*B66B 1/28* (2006.01)
*B66B 19/00* (2006.01)

(52) U.S. Cl.
CPC .................................... *B66B 19/00* (2013.01)

(58) Field of Classification Search
CPC ...................................................... B66B 19/00
See application file for complete search history.

(56) References Cited

U.S. PATENT DOCUMENTS

| | | | | |
|---|---|---|---|---|
| 8,646,224 | B2 | 2/2014 | Wurth | |
| 2007/0181381 | A1 | 8/2007 | Jungbauer et al. | |
| 2008/0308362 | A1* | 12/2008 | Tucker | B66B 19/00 187/414 |
| 2015/0307322 | A1* | 10/2015 | Peacock | B66B 7/064 187/254 |
| 2017/0267490 | A1* | 9/2017 | Haapaniemi | B66B 11/005 |
| 2019/0177120 | A1* | 6/2019 | Studer | B66B 19/00 |

(Continued)

FOREIGN PATENT DOCUMENTS

| | | | |
|---|---|---|---|
| CN | 105971262 | A | 9/2016 |
| CN | 108367897 | A | 8/2018 |
| CN | 108689275 | A | 10/2018 |

(Continued)

*Primary Examiner* — Amy J. Sterling
(74) *Attorney, Agent, or Firm* — William J. Clemens; Shumaker, Loop & Kendrick, LLP

(57) ABSTRACT

An installation device for use in an elevator shaft includes a carrier that extends in a carrier direction, the carrier having a first carrier end and a second carrier end, a support element that is pivotably arranged on the first carrier end and a receiving device for receiving a displacement device by which installation material can be displaced in the elevator shaft. The receiving device is supported on the carrier via an adjustable support device such that an angle between a support plane, in which plane a support surface of the receiving device extends, and the carrier direction of the carrier can be changed.

11 Claims, 3 Drawing Sheets

(56) References Cited

U.S. PATENT DOCUMENTS

2020/0239269 A1* 7/2020 Herkel .................. B66B 5/0068

FOREIGN PATENT DOCUMENTS

| | | | |
|---|---|---|---|
| CN | 109563709 | A | 4/2019 |
| CN | 110382395 | A | 10/2019 |
| WO | 2017016783 | A1 | 2/2017 |
| WO | 2019052970 | A1 | 3/2019 |

* cited by examiner

INSTALLATION DEVICE FOR USE IN AN ELEVATOR SHAFT

FIELD

The invention relates to an installation device for use in an elevator shaft to displace installation material in the elevator shaft.

BACKGROUND

WO 2019/052970 A1 describes an installation device for use in an elevator shaft, which device has two carriers which extend parallel in a carrier direction and have a first carrier end and a second carrier end. The carriers each have a support element which is pivotably arranged at the first carrier end. The support elements are designed and arranged such that, in an installation position of the installation device, the carriers are supported via the support elements in the region of a door opening, in particular on a threshold of a door opening of the elevator shaft. The second carrier ends are designed such that, in the installation position of the installation device, the carriers are at least indirectly supported via the second carrier ends on a shaft wall which is opposite the mentioned door opening of the elevator shaft. The length of the carriers is greater than the distance between the shaft wall and the threshold of the door opening, such that in the installation position, the carriers are arranged in the elevator shaft so as to be inclined upward relative to the horizontal.

The installation device also has a receiving device for receiving a displacement device by means of which installation material can be displaced in the elevator shaft. The receiving device for receiving the displacement device is designed and is arranged on the installation device in the installation position of the installation device such that a displacement device which is received by the receiving device is supported from above on the receiving device in the installation position of the installation device. The receiving device is arranged in the region of the first carrier ends. The displacement device is arranged on the receiving device such that a suspension means, via which the displacement device can displace installation material in the elevator shaft, initially extends along the carrier in the carrier direction and is then deflected via a deflection roller into the vertical.

SUMMARY

In contrast, it is an object of the invention to propose an installation device for use in an elevator shaft, which device can be constructed particularly simply and/or can be brought into the installation position thereof particularly simply. According to the invention, this problem is solved by an installation device having the features described below.

The installation device according to the invention for use in an elevator shaft has a carrier which extends in a carrier direction, a support element and a receiving device for receiving a displacement device by means of which installation material can be displaced in the elevator shaft. The carrier has a first carrier end and a second carrier end. The support element is pivotably arranged on the first carrier end and is designed and arranged such that, in an installation position of the installation device, the carrier can be supported via the support element in the region of a door opening of the elevator shaft. The second carrier end is designed such that, in the installation position of the installation device, the carrier can be at least indirectly supported via the second carrier end on a shaft wall which is opposite the mentioned door opening of the elevator shaft. The length of the carrier is in particular greater than the distance between the shaft wall and the threshold of the door opening, such that in the installation position, the carrier is arranged in the elevator shaft in particular so as to be inclined upward relative to the horizontal. Given a fixed length of the carrier, the mentioned inclination of the carrier depends on the mentioned distance between the shaft wall and the threshold of the door opening. The inclination decreases with increasing distance and thus increasing depth of the elevator shaft.

The receiving device for receiving the displacement device is designed and arranged on the installation device in the installation position of the installation device such that a displacement device which is received by the receiving device is supported from above on a support surface of the receiving device in the installation position of the installation device.

According to the invention, the receiving device is supported on the carrier via an adjustable support device such that an angle between a support plane, in which the support surface of the receiving device extends, and the carrier direction of the carrier can be changed.

The support plane in which the support surface of the receiving device extends can thus be adjusted independently of the above-described inclination of the carrier relative to the horizontal and thus independently of the depth of the elevator shaft such that the plane extends horizontally or at least approximately horizontally. If the displacement device is arranged on the receiving device, a suspension means, via which the displacement device can displace installation material in the elevator shaft, can extend vertically downward directly and without deflection. This means that no deflection is required for the suspension means, which makes a simple construction of the installation device possible. In addition, the installation device requires only one carrier, which results in the low weight of the installation device. The installation device can thus be easily brought into the installation position thereof in the elevator shaft.

The support surface of the receiving device is formed in particular by a frame, which can consist of metal profiles, for example. In particular, the frame has a rectangular basic shape. In particular, the frame is open, such that the suspension means of the displacement device supported on the frame can extend downward unhindered.

The displacement device provided for the installation device is designed in particular as an electric winch that can be controlled by a control device. The displacement device interacts with a suspension means, which can be designed, for example, as a cable, a belt or a chain. The displacement device is not a necessary, but merely an optional component of the installation device according to the invention.

The installation device can be used in particular during the installation of an elevator system in an elevator shaft. It can be used particularly advantageously when the elevator system does not have a machine room located above the elevator shaft or the elevator shaft is so tall that an installation device has to be arranged at different heights when the elevator system is installed. Installation material required during installation can be displaced in the elevator shaft by means of a displacement device arranged on the installation device. The installation material can be, for example, guide rails that are fixed to shaft walls and are used to guide an elevator car. It is also possible that a working platform on which fitters can carry out installation work is displaced by the displacement device in the elevator shaft. In particular, the installation device according to the invention is used to displace an automated mounting device for carrying out installations in an elevator shaft, as is described, for example, in WO 2017/016783 A1.

The carrier is designed as an element that is elongate in the carrier direction and consists in particular of metal. It is also possible for the carrier to consist of a different material, for example a reinforced plastics material or carbon. For example, the carrier may be mainly composed of a T-beam, a double T-beam, or a tube. The carrier can be designed, for example, like a carrier described in U.S. Pat. No. 8,646,224 B2, in the form of a "construction apparatus."

The support element is arranged pivotably on the first carrier end of the carrier, with the associated pivot axis extending in particular perpendicularly to the carrier direction of the carrier and horizontally in the installation position of the installation device. The support element has in particular two contact elements which form a right angle. The contact elements are designed and arranged such that, in the installation position of the installation device, one contact element rests on the ground of a threshold of a door opening and the other rests on the shaft wall adjacent to the threshold. The contact elements have in particular through-holes, via which they and thus the support element can be screwed to the ground or the shaft wall.

The installation position of the installation device is to be understood here as meaning the position of the installation device in which the device can be used for installing an elevator system in the elevator shaft. In the installation position, the carrier is supported via the support element on the threshold of a door opening of the elevator shaft, the support element being fixed to the threshold in particular as described above. In addition, the carrier is at least indirectly supported via the second carrier end on a shaft wall which is opposite the mentioned door opening of the elevator shaft. Indirect support is to be understood to mean that a further support element is arranged at the second carrier end, via which element the second carrier end is supported on the shaft wall. It is also possible that the second carrier end is supported directly on the shaft wall. The second carrier end is supported in particular at a height above the mentioned threshold such that the carrier is arranged so as to be inclined upward, starting from the threshold. The shaft wall opposite the door opening can also have a shoulder on which the carrier can rest. In this way, the carrier can also be arranged horizontally or so as to be inclined downward, starting from the threshold.

The receiving device for receiving the displacement device has a support surface on which, in the installation position of the installation device, at least part of the displacement device stands and this part is thus supported from above on the receiving device.

In order to bring the installation device into the elevator shaft or into the installation position in the elevator shaft, an installation platform protruding into the elevator shaft can be temporarily installed. The installation platform protrudes into the elevator shaft in particular via the mentioned door opening and is held from outside the elevator shaft. Temporary installation platforms of this kind are often used in the installation of what are known as high-rise elevators, i.e. elevators in buildings with many floors.

In an embodiment of the invention, the adjustable support device has a multi-part arm which has at least a first arm part and a second arm part. The two arm parts are designed to be displaceable relative to one another, which means that the length of the arm can be changed. In this way, the described change in the angle between the support plane and the carrier direction can be implemented simply and cost-effectively.

The mentioned multi-part arm is in particular designed in two parts, but it can also have more than two arm parts. The multi-part arm is arranged such that a first end is supported at least indirectly on the carrier and a second end is connected to a first side of the receiving device. By changing the length of the arm, the mentioned angle can be changed and in particular the support plane and thus the support surface can be aligned horizontally. The receiving device is coupled to the support device and thus to the carrier, in particular via a pivot axis which is arranged so as to be stationary relative to the carrier. The pivot axis is arranged on a second side of the receiving device, which side is opposite the first side. By changing the length of the multi-part arm, the receiving device is pivoted about the mentioned pivot axis relative to the support device and thus relative to the carrier.

The two arm parts are displaced relative to one another by a fitter by hand. However, it is also possible for the support device to have an actuator, for example in the form of an electric spindle drive or a hydraulic or pneumatic piston-cylinder unit, by means of which the two arm parts can be displaced relative to one another.

In particular, the adjustable support device has more than one multi-part arm, in particular two multi-part arms. In this way, a particularly secure and stable support of the receiving device and thus of a displacement device which is received by the receiving device can be achieved.

The first arm part and the second arm part are in particular designed to be displaceable in one another. This makes it possible for the support device and thus the installation device to have a particularly simple and cost-effective design.

For this purpose, the first arm part and the second arm part are designed, for example, as metal profiles, an inner contour of the second arm part being adjusted to an outer contour of the first arm part such that the inner contour can receive the first arm part. The metal profiles can have a rectangular or round cross section, for example. It is also possible that the two arm parts extend next to one another and can thus be displaced relative to one another.

The first arm part and the second arm part can be fixed in particular in different positions relative to one another with a bolt. A desired position of the two arm parts relative to one another can thus be secured simply and cost-effectively, which ensures safe operation of the installation device.

For this purpose, an arm part, for example the first arm part, has a plurality of recesses, for example in the form of through-holes, which can be brought into alignment with a recess of the second arm part. A bolt can be inserted through the aligned recesses in the first arm part and in the second arm part, whereby the two arm parts are fixed relative to one another. It is also possible that the two arm parts have a plurality of recesses.

In an embodiment of the invention, the receiving device has at least one side skirt for securing the displacement device, which skirt runs in a direction which deviates from the support plane. This effectively prevents a displacement device which is received by the receiving device from detaching from the receiving device and, in the worst case, from falling down in the elevator shaft in an uncontrolled manner. Safe operation of the installation device is thus guaranteed.

The mentioned side skirt extends upward, in particular perpendicularly to the support plane. In particular, the side skirt is adjusted to a height of the displacement device provided such that the displacement device does not protrude beyond the side skirt. The side skirt has in particular recesses or openings via which the displacement device can be secured, for example by means of screws. In particular, the receiving device has two side skirts which are arranged such that the displacement device is located between the two side skirts. The two side skirts can be designed to be the same or different. In particular, the side skirts can differ in the height thereof, i.e. in the extension thereof in the vertical upward direction in the mounted state.

In an embodiment of the invention, the receiving device can be arranged in different positions on the carrier in a transverse direction which extends transversely to the carrier direction of the carrier. This makes a flexible design of the installation device possible. The position of the receiving device relative to the carrier can thus be adjusted to the design of the displacement device. In particular, the position of the receiving device can be selected such that the suspension means of the displacement device extends past the carrier safely and at a sufficient distance. In addition, the suspension means can thus be guided past different sides of the carrier.

In order to make the mentioned flexible arrangement of the receiving device possible, the receiving device has in particular a first side and a second side which is opposite the first side in the carrier direction. In this case, connection elements for establishing a connection to the adjustable support device are arranged on the first side and on the second side, the connection taking place via connection elements both on the first side and on the second side. The connection elements on the first side and on the second side are arranged such that the first side can be oriented either in the direction of the first carrier end or in the direction of the second carrier end. In this way, the mentioned flexible design of the installation device can be achieved particularly simply and cost-effectively.

The receiving device can be connected to the support device in two different positions, with a change between the positions taking place by rotating the receiving device by 180° about the vertical. The connection elements on the two sides of the receiving device are arranged offset in the transverse direction such that in the two mentioned positions of the receiving device there are different positions of the receiving device relative to the carrier in the transverse direction. In particular, connection elements are arranged on each of the two sides of the receiving device, which connections are only used in one of the two mentioned positions.

In an embodiment of the invention, the receiving device and the adjustable support device form an assembly that can be removed from the carrier. This means that the carrier can also be used for other purposes.

The mentioned assembly can, for example, be mounted on the carrier and thus fixed thereto by means of U-shaped holders which encompass the carrier. It is also possible for the carrier to have recesses, for example in the form of threaded holes, via which the mentioned assembly can be mounted on the carrier and thus fixed thereto. The mentioned connections of the assembly to the carrier are designed to be detachable, such that the assembly can be removed from the carrier.

The assembly consisting of the receiving device and the adjustable support device can be mounted on the carrier at different positions in particular in the carrier direction. In this way, a desired position of the displacement device in the carrier direction and thus a desired course of the suspension means of the displacement device can advantageously be adjusted.

The described arrangement of the mentioned assembly on the carrier at different positions in the carrier direction is implemented, for example, by designing the mentioned U-shaped holders and the carrier such that they can be arranged in different positions relative to one another. Alternatively or additionally, the carrier can have a plurality of recesses which are offset in the carrier direction for fixing the mentioned assembly.

The assembly consisting of the receiving device and the adjustable support device in the carrier direction is in particular arranged on the carrier such that it can be displaced relative to the carrier. As a result, it is advantageously possible that the mentioned assembly does not have to be assembled fixedly on the carrier before the displacement device is arranged on the receiving device. The displacement device can then already be arranged on the receiving device when the mentioned assembly is still in the vicinity of the first carrier end. The mentioned assembly can then be brought or pulled into the intended position thereof with the displacement device, for example with a chain hoist. The arrangement of the displacement device at the intended position thereof can thus be adjusted particularly well to the space available in the elevator shaft.

The described displacement of the mentioned assembly relative to the carrier in the carrier direction is implemented, for example, by designing the mentioned U-shaped holders and the carrier such that they can be displaced relative to one another.

In an embodiment of the invention, the installation device has a displacement device which is received by the receiving device. The displacement device thus forms part of the installation device.

Further advantages, features and details of the invention will become apparent from the following description of embodiments and from the drawings, in which identical or functionally identical elements are denoted with identical reference signs. The drawings are merely schematic and are not to scale.

DETAILED DESCRIPTION

Figure 1:
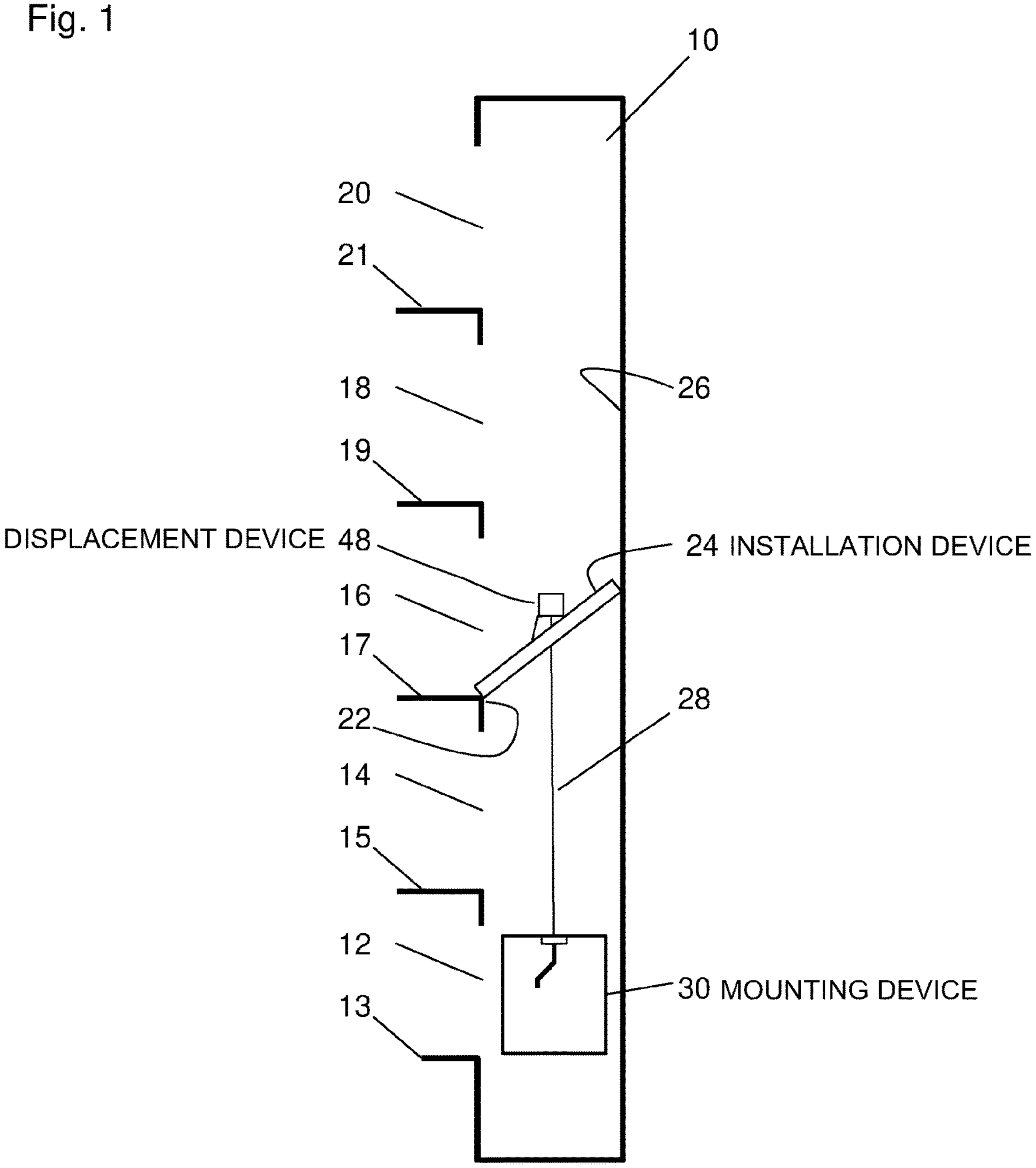
FIG. 1 shows an installation device according to the invention in an installation position in an elevator shaft and an attached automated mounting device.

According to FIG. 1, an elevator shaft 10 for an elevator system (not shown) has a first, bottom door opening 12, to which a first, bottom floor 13 is assigned. This first, bottom floor 13 is followed at the top by a second floor 15 having a second door opening 14, a third floor 17 having a third door opening 16, a fourth floor 19 having a fourth door opening 18 and a fifth, top floor 21 having a fifth, top door opening 20.

At a threshold 22 of the third floor 17, an installation device 24, which is shown in a very simplified form in FIG.

1, is supported diagonally upward in the elevator shaft 10. The installation device 24 is also supported on a shaft wall 26 which is opposite the third shaft opening 16. The installation device 24 has a displacement device 48 in the form of an electric winch. An automated mounting device 30 is suspended from the displacement device 48 and thus from the installation device 24 via a suspension means 28 of the displacement device 48, for example in the form of a cable or a chain, by means of which mounting device assembly steps can be carried out in the elevator shaft 10 in an at least semi-automated manner. The mounting device 30 can be designed, for example, in accordance with a mounting device described in WO 2017/016783 A1. The mounting device 30 can be vertically displaced in the elevator shaft 10 by means of the displacement device 48 and the suspension means 28. In the position of the installation device 24 shown in FIG. 1, the mounting device 30 can carry out assembly work in the elevator shaft 10 at the height of the first and second floors 13, 15. The mounting device 30 is used when installing an elevator system in the elevator shaft 10 and can therefore be referred to as installation material.

In order to be able to carry out assembly work further up in the elevator shaft 10, the installation device 24 can be brought into the installation position on the fifth floor 21. Before the installation device 24 is removed from the third floor 17, the mounting device 30 can be temporarily stored on the second floor 15. When the installation device 24 has been brought back into the installation position on the fifth floor 21, the mounting device 30 can be brought back into the elevator shaft 10 from the second floor 15.

In reality, elevator shafts in which an installation device of this kind and an automated mounting device are used have significantly more than 5 floors, for example at least 15 floors. The installation device can move the mounting device in particular over more than 2 floors, for example 30 floors or approximately 100 m.

Figure 2:
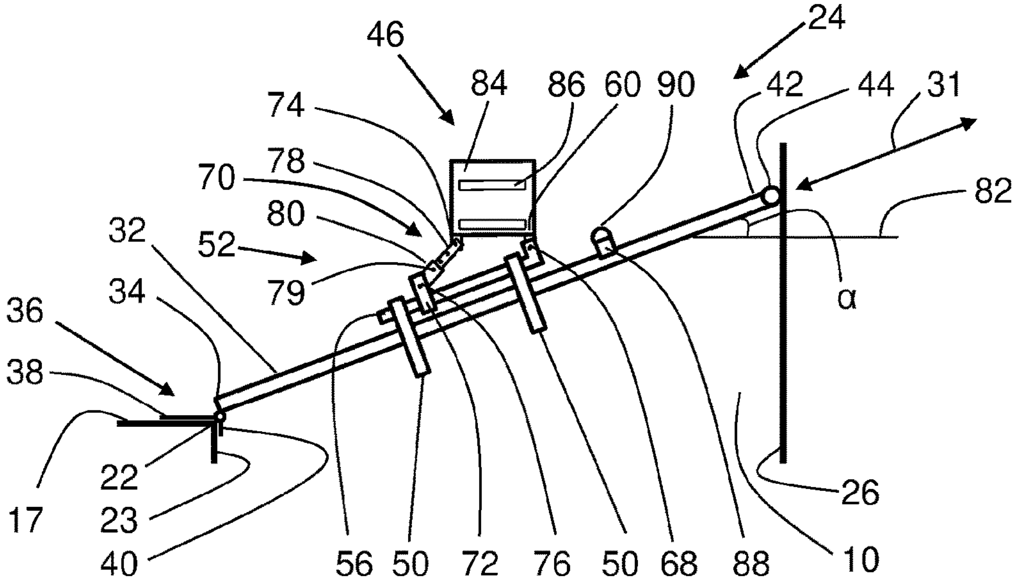
FIG. 2 is a side view of an installation device in an installation position in a first elevator shaft.
Figure 3:
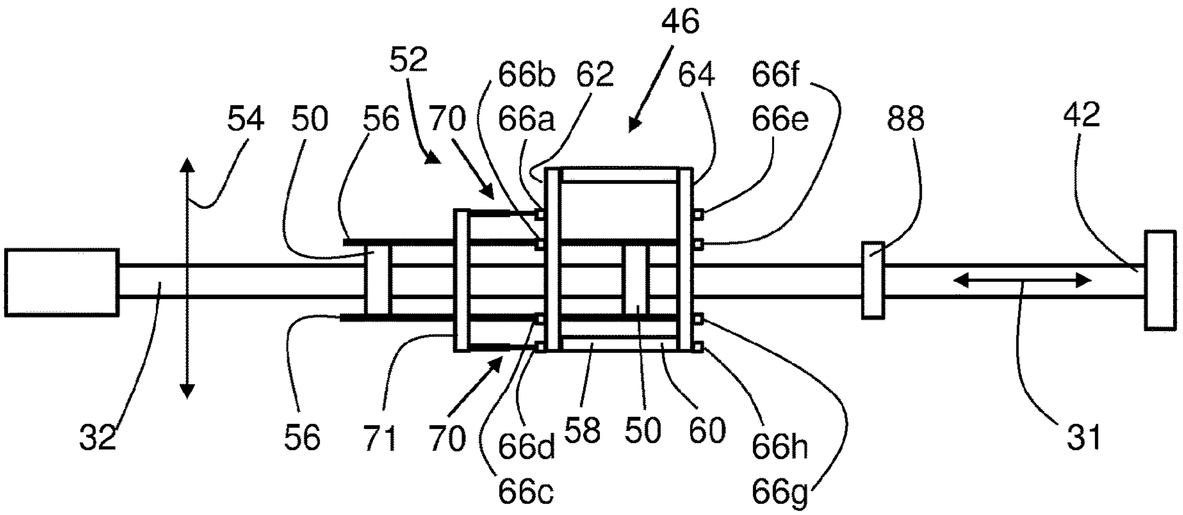
FIG. 3 is a plan view of the installation device from FIG. 2 in a slightly enlarged representation.

According to FIGS. 2 and 3, the installation device 24 has an elongate carrier 32 which extends in a carrier direction 31, at the first end 34 of which carrier a support element 36 is pivotably arranged. The pivot axis in FIG. 2 extends perpendicularly to the representation plane. The support element 36 has a first, flat contact element 38 which, in the installation position of the installation device 24, rests against the ground of a floor 17 and is fixed to the ground with screws. The support element 36 also has a second, flat contact element 40, which is arranged perpendicularly to the first contact element 38 and, in the installation position of the installation device 24, rests against the shaft wall 23, which forms the threshold 22 with the ground of the floor 17, and is fixed to this wall with screws.

The carrier 32 is supported at a second carrier end 42 opposite the first carrier end 34 on the shaft wall 26 of the elevator shaft 10. A first holder 44 is arranged at the second carrier end 42, to which holder a suspension cable (not shown) and a safety tether (not shown) for triggering a safety brake of the automated mounting device can be attached. The holder 44 is screwed to the carrier 32. It can also be clamped to the carrier using suitable brackets.

An adjustable support device 52 is arranged approximately centrally on the carrier 32 by means of two U-shaped holders 50 which encompass the carrier 32. The adjustable support device 52 has two longitudinal beams 56 which extend in the carrier direction 31 and are spaced apart from one another in a transverse direction 54 which extends perpendicularly to the carrier direction 31. The longitudinal beams 56 are firmly connected to the carrier 32 via the two holders 50 such that the adjustable support device 52 is supported on the carrier 32.

The adjustable support device 52 bears a receiving device 46 for receiving a displacement device (not shown in FIGS. 2 and 3). The receiving device 46 has a rectangular frame 58 made of metal profiles, which frame forms a support surface 60 of the receiving device 46. The frame 58 is open on the inside, such that the suspension means of the displacement device, which is also not shown in FIGS. 2 and 3, can extend downward unhindered. The receiving device 46 has a first side 62 which is oriented in the direction of the first carrier end 34 and a second side 64 which is opposite the first side in the carrier direction 31 and is therefore oriented in the direction of the second carrier end 42. Connection elements 66*a*, 66*b*, 66*c*, 66*d* which are arranged next to one another in the transverse direction 54 are arranged on the first side 62 of the receiving device 46. Connection elements 66*e*, 66*f*, 66*g*, 66*h* which are arranged next to one another in the transverse direction 54 are arranged on the second side 64 of the receiving device 46. The connection elements 66*a*, 66*b*, 66*c*, 66*d*, 66*e*, 66*f*, 66*g*, 66*h* are designed as tabs made of metal which extend downward away from the receiving device 46 and each have a through-opening.

The receiving device 46 is connected to the longitudinal beams 56 of the support device 52 via the connection elements 66*f* and 66*g* on the second side 64 of the receiving device 46. The connection is established by a bolt 68, which protrudes through a through-opening (not shown) in the longitudinal beam 56 and through the mentioned opening of the connection elements 66*f* and 66*g* and is secured. The receiving device 46 can thus be pivoted about the bolt 68 relative to the longitudinal beams 56 and thus relative to the carrier 32.

Via the connection elements 66*a* and 66*d* on the first side 62 of the receiving device 46, the receiving device 46 is connected via a multi-part arm 70 to a transverse beam 71 of the support device 52, which transverse beam extends in the transverse direction 54 and is fixed to the longitudinal beams 56. For this purpose, the transverse beam 71 has two tabs 72 with which the connection to the arms 70 is established. The connection between the arms 70 and the connection elements 66*a* and 66*d* is established by a bolt 74 which protrudes into the arms 70 and through the mentioned opening of the connection elements 66*a* and 66*d* through a through-opening (not shown) and is secured. The receiving device 46 can thus be pivoted about the bolt 74 relative to the arms 70. The connection between the arms 70 and the tabs 72 of the transverse beam 71 of the support device 52 is established by a bolt 76 which protrudes into the arms 70 and the tabs 72 of the transverse beam 71 of the support device 52 through a through-opening (not shown) and is secured. The arms 70 can thus be pivoted about the bolts 76 relative to the transverse beams 71 of the support device 52 and thus relative to the carrier 32.

The arms 70 consist of two arm parts that can be displaced relative to one another. A first arm part 78 which is connected to one of the connection elements 66*a*, 66*b* can be pushed into a second arm part 80 which is connected to one of the tabs 72 of the longitudinal beams 56 of the support device 52 and can be secured in different positions with a bolt 79. The arm parts 78, 80 are designed as metal profiles, a rectangular inner contour of the second arm part 80 being adjusted to an outer contour of the first arm part 78 such that the contour can receive the first arm part 78. The first arm part 78 has a plurality of through-holes indicated by dots, each of which can be brought into alignment with a through-hole of the second arm part 80, which through-hole is also indicated as a dot. The bolt 79 is inserted through the aligned recesses in the first arm part 78 and in the second arm part 80 and secured, whereby the two arm parts 78, 80 are fixed relative to one another.

By telescoping the two arm parts 78, 80 into one another or pulling them apart, the length of the arm 70 can be changed and the receiving device 46 can thus be pivoted about the bolt 68 relative to the longitudinal beams 46 and thus relative to the carrier 32. By fixing the two arm parts 78, 80 relative to one another with the bolt 79, a fixed position of the receiving device U.S. Pat. No. 8,646,224 B2 relative to the longitudinal beams 46 and thus relative to the carrier 32 can be set. An angle α between a support plane 82, in which the support surface 60 of the receiving device 46 extends, and the carrier direction 31 of the carrier 32 can thus be changed. The mentioned angle α is in particular adjusted such that the support plane 82 extends horizontally or at least approximately horizontally.

The receiving device 46 also has two side skirts 84 for securing a displacement device which is received by the receiving device 46 between the side skirts 84. The side skirts 84 extend upward perpendicularly from the support plane 82. The side skirts 84 have recesses 86 via which the displacement device can be secured by means of screws. The two side skirts can be designed to be the same or different. In particular, the side skirts can differ in the height thereof, i.e. in the extension thereof in the vertical upward direction in the mounted state.

Figure 5:
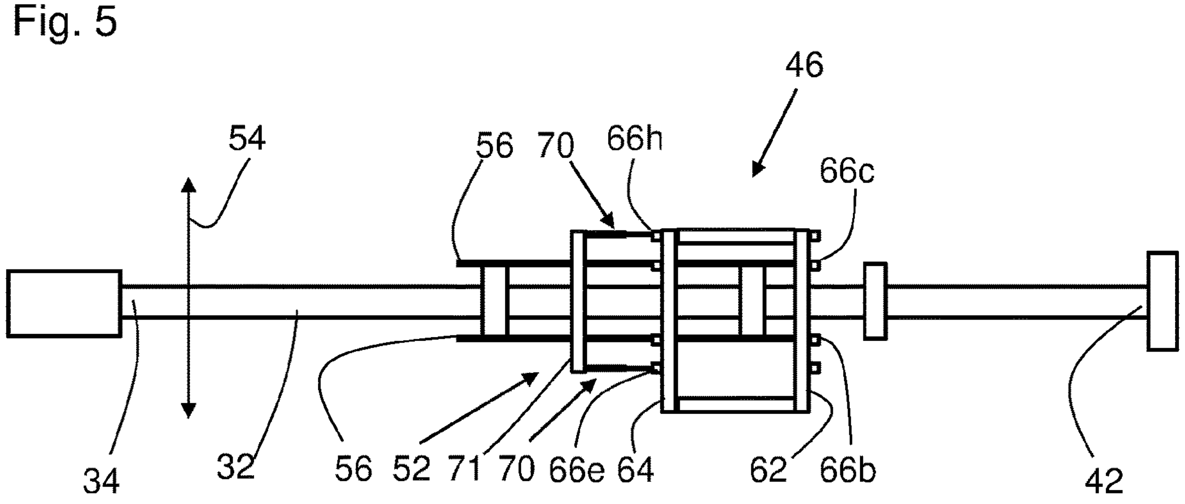
FIG. 5 is a plan view of the installation device from FIG. 4 in a slightly enlarged representation.

The connection elements 66*a*, 66*b*, 66*c*, 66*d*, 66*e*, 66*f*, 66*g*, 66*h* are arranged in the transverse direction 54 such that the first side 62 of the receiving device 46 having the connection elements 66*a*, 66*b*, 66*c*, 66*d* can be oriented, as shown in FIG. 3, in the direction of the first carrier end 34 or, as shown in FIG. 5, in the direction of the second carrier end 42. Since the connection elements 66*a*, 66*b*, 66*c*, 66*d* and 66*e*, 66*f*, 66*g*, 66*h* are arranged offset along the first side 62 and the second side 64, respectively, in the two mentioned positions of the receiving device 46 in the transverse direction 54, different positions of the receiving device 46 relative to the carrier 32 result.

A second holder 88 is arranged between the second side 64 of the receiving device 46 and the second carrier end 42 and is screwed to the carrier 32. The second holder 88 has an eyelet 90 to which a cable (not shown) can be attached. This cable can be used to pivot the installation device into and out of the installation position in a controlled manner.

Figure 4:
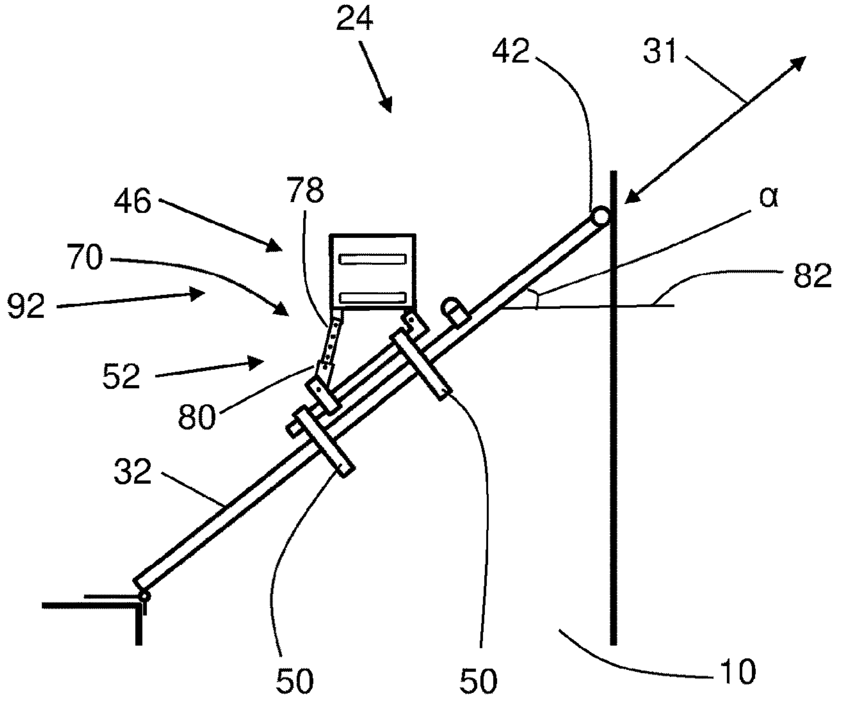
FIG. 4 shows the installation device from FIG. 2 in the installation position in a second elevator shaft, which is less deep than the first elevator shaft.

In FIGS. 4 and 5, the installation device 24 is shown in an elevator shaft 10 which is less deep in comparison to FIG. 2. The carrier direction 31 is therefore inclined upward to a greater extent in comparison to FIG. 2. So that the support plane 82 nevertheless extends horizontally, the first arm parts 78 of the arms 70 are pulled further out of the second arm parts 80 in comparison to FIG. 2. This leads to a larger angle α between the support plane 82 and the carrier direction 31 in comparison to FIG. 2.

So that the suspension means of a displacement device which is received by the receiving device 46 also extends approximately in the center in the less deep elevator shaft 10, the combination of the support device 52 and the receiving device 46 was moved further in the direction of the second carrier end 42 on the carrier 32 by means of the holder 50 in comparison to FIG. 2. For this purpose, the mentioned combination was first removed from the carrier 32 and then remounted on the carrier 32 in the appropriate position. The combination of the support device 52 and the receiving device 46 thus forms an assembly 92 which can be removed from the carrier 32 and mounted on the carrier 32 at different positions in the carrier direction 31.

The assembly consisting of the receiving device and the adjustable support device in the carrier direction can also be arranged on the carrier such that it can be displaced relative to the carrier. In this way, the displacement device can already be arranged on the receiving device when the mentioned assembly is still in the vicinity of the first carrier end. The mentioned assembly can then be brought or pulled into the intended position thereof with the displacement device, for example with a chain hoist. The described displacement of the mentioned assembly relative to the carrier in the carrier direction is implemented in particular by designing the mentioned U-shaped holders and the carrier such that they are displaceable relative to one another.

As can be seen in FIG. 5, the carrier device 46 is arranged in a different position in the transverse direction 54 relative to the carrier 32 in comparison to FIG. 2. The first side 62 of the receiving device 46 is oriented in the direction of the second carrier end 42 and the second side 64 of the receiving device 46 is oriented in the direction of the first carrier end 34. The connection elements 66*h*, 66*e* of the second side 64 are thus connected to the arms 70 and the connection elements 66*b*, 66*c* are connected to the transverse beam 71 of the support device 52.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An installation device for use in an elevator shaft, the installation device comprising:

a carrier extending in a carrier direction and having a first carrier end and a second carrier end;

a support element pivotably arranged on the first carrier end of the carrier;

a receiving device arranged on the carrier and adapted to receive a displacement device by which installation material can be displaced in the elevator shaft;

wherein the support element, when in an installation position of the installation device, supports the carrier in a region of a door opening of the elevator shaft;

wherein the second carrier end, when in the installation position of the installation device, is at least indirectly supported on a shaft wall of the elevator shaft opposite the door opening;

wherein the receiving device, when in the installation position of the installation device, receives and supports the displacement device from above the carrier on a support surface of the receiving device; and wherein the receiving device is supported on the carrier via an adjustable support device such that an angle between a support plane, in which plane the support surface extends, and the carrier direction can be changed.

2. The installation device according to claim 1 wherein the adjustable support device has a multi-part arm with a first arm part and a second arm part that are displaceable relative to one another such that a length of the arm can be changed.

3. The installation device according to claim 2 wherein the first arm part and the second arm part are displaceable one inside another.

4. The installation device according to claim 2 wherein the first arm part and the second arm part are fixable in different positions relative to one another with a bolt.

5. The installation device according to claim 1 wherein the receiving device has at least one side skirt for securing the displacement device, the at least one side skirt extending in a direction that deviates from the support plane.

6. The installation device according to claim 1 wherein the receiving device can be arranged in different positions on the carrier in a transverse direction that extends transversely to the carrier direction.

7. The installation device according to claim 6 wherein:

the receiving device has a first side and a second side opposite to and spaced from the first side in the carrier direction;

a plurality of connection elements adapted to establish a connection to the adjustable support device, each of the connection elements being arranged on one of the first side and the second side, the connection being both via the connection elements on the first side and via the connection elements on the second side; and wherein the connection elements are arranged such that the first side can be oriented either between the first carrier end and the second side or between the second carrier end and the second side.

8. The installation device according to any of claim 1 wherein the receiving device and the adjustable support device form an assembly that is removable from the carrier.

9. The installation device according to claim 8 wherein the assembly is adapted to be mounted on the carrier at different positions in the carrier direction.

10. The installation device according to claim 8 wherein the assembly can be displaced relative to the carrier in the carrier direction.

11. The installation device according to claim 1 including the displacement device received by the receiving device.

* * * * *